United States Patent Office 3,176,920
Patented Apr. 6, 1965

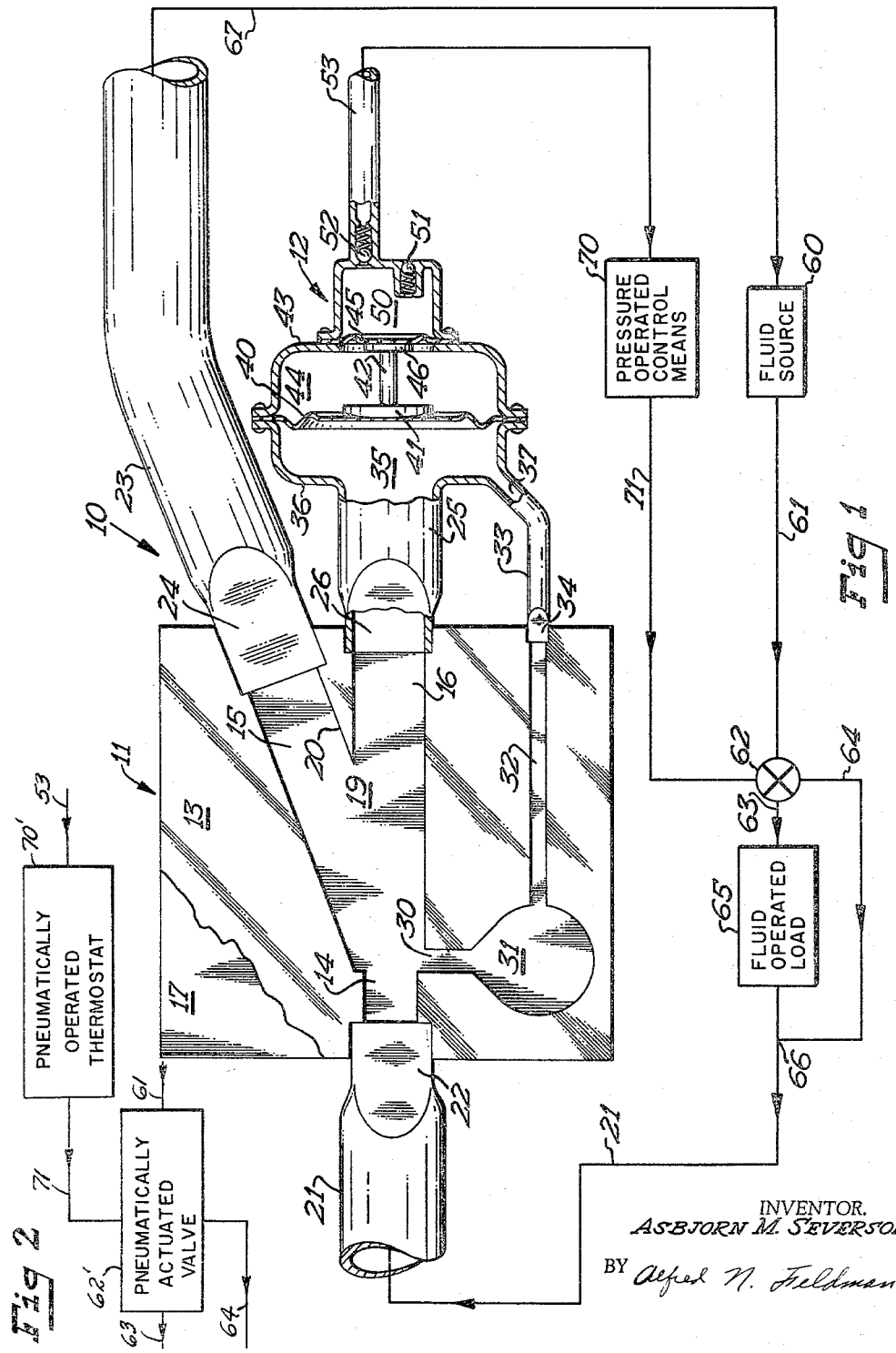

3,176,920
FLUID OPERATED PUMP
Asbjorn M. Severson, Minneapolis, Minn., assignor to Honeywell Inc., a corporation of Delaware
Filed May 26, 1961, Ser. No. 113,022
10 Claims. (Cl. 236—79)

The present invention is directed to a unique type of pressure operated pump, and more particularly is directed to a diaphragm sealed pump that is operated through the oscillations of a fluid amplifier in a fluid control system.

One of the more common types of air conditioning systems currently in commercial use is a system that utilizes heated or chilled water in a plumbing system that is directed through a radiator or heat exchange means. In the summertime cold water is pumped through the air conditioning system and air is blown across the chilled radiator to in turn cool the air in a confined space. In the wintertime the water is heated and the same function occurs so that air can be heated. Normally this type of system is controlled by a thermostat that operates a valve at the radiator, or heat exchange means, to pass the conditioned water through the heat exchange means or around it. The thermostat in many cases is powered by air and is normally referred to as a pneumatic thermostat. The air supply for the pneumatic thermostat is generally available from a central compressor and is distributed by copper tubing to the various thermostats in the installation. Due to the cost of the compressor and associated equipment, it would be very desirable in this type of air conditioning system to have an individual air supply available at each room thermostat but normally the pumping means for this type of an installation is not available.

In the present invention the water flow of the heating or cooling system is utilized to drive a small pump at or near the location of the thermostat. The small pump supplies air pressure for the operation of the thermostat and associated control equipment. The control equipment normally is in the form of a valve of a pneumatically operated type.

It is a primary object of the present invention to disclose a novel type of pump system that uses a fluid amplifier as a driving means for the system.

Another object of the present invention is to disclose a pump that is operated by an already existing power source that would not normally be used as a prime mover for a conventional pump.

Yet another object of the present invention is to disclose a novel air conditioning system that utilizes the flowing conditioning fluid as a motive power or force for the control power for the over-all system.

A still further object of the present invention is to disclose a pump operated by a water stream and said pump in turn supplying air pressure to control the water stream through a device such as a pneumatic thermostat and pneumatically controlled valve.

These and other objects will become apparent when the drawings are considered with the present specification wherein:

FIGURE 1 is a diagrammatic representation of an air conditioning control system utilizing a fluid pressure driven pump; and FIGURE 2 is a diagrammatic representation of a modification of a portion of the system of FIGURE 1.

In FIGURE 1, a fluid pressure driven pump system 10 is disclosed which incorporates a fluid amplifier means 11 and a diaphragm operated pump means 12. The fluid amplifier means as disclosed is of a type becoming well known in the literature as developed at the Diamond Ordnance Fuze Laboratory. The fluid amplifier means 11 is a biased type, that is, the fluid flow from the device normally flows in one of its outlets as opposed to the other. The fluid amplifier could be of a type disclosed by Richard J. Reilly in an application filed November 16, 1960, and which was assigned Serial No. 69,645, now Patent No. 3,030,979. The type of fluid amplifier utilized is not directly material to the present invention and it will be appreciated, after a description of operation, that any of a number of fluid amplifiers generally having no moving parts for switching a fluid can be used. For clarity's sake, one specific type is shown as fluid amplifier means 11.

Fluid amplifier means 11 is formed of a block 13 of material such as metal or plastic and has a rectangular inlet means 14 and two rectangular outlets 15 and 16. The body 13 is sealed in a fluid tight manner by a cover 17 that can be attached by any convenient means. The inlet channel or means 14 is directed generally at the outlet means 19, and the outlet channel 16 specifically. A splitter 20 separates the outlet means 19 into channels 15 and 16 so that two separate fluid flows are possible in compliance with the theory of operation of fluid amplifiers generally.

The inlet means or channel 14 is connected to a pipe 21 which has been flattened at 22 so that it can be inserted between the body 13 and the cover 17 in a fluid tight fashion. An outlet pipe 23 forms a continuous flow passage that is unobstructed for the over-all system, as will be seen below. Pipe 23 is flattened at 24 once again to fit between the body 13 and the cover 17 in a fluid tight fashion. A pipe 25 with flattened portion 26 is inserted in the second channel 16 and again is sealed in a fluid tight fashion so that the fluid amplifier means 11 has its two outlets sealed with piping. A control means 30 in the form of a port connects to a pressure equalizing chamber 31 that in turn connects to a feedback connection means 32 that has an associated pipe 33 that is flattened at 34, again for the purpose of obtaining a fluid tight seal. The control means 30 forms a port that in turn provides a jet of fluid from the pressure equalizing chamber 31 against the side of any fluid flowing in inlet 14. The application of a control jet from port 30 provides the switching action necessary in the fluid amplifier as will be briefly described in connection with the operation of the system.

Pipe 25 is expanded into a chamber 35 that has a flared wall 36 integral with pipe 25. The chamber 35 further has a feedback passage 37 that is formed into pipe 33 that connects back to the connection means 32. The chamber 35 is sealed by a flexible diaphragm 40 that supports a plate 41 and shaft 42 within a second housing 43. The housing 43 seals a chamber 44 that transmits movements of the diaphragm 40 through the shaft 42 to a second diaphragm 45. The second diaphragm 45 has a plate 46 connected to the shaft 42 and thereby moves along with the diaphragm 40. The double diaphragm arrangement has been shown as a force amplifying means and could be replaced by a single diaphragm. A chamber 50, of relatively small volume, is provided with an inlet check valve means 51 and an outlet check valve means 52, both of conventional design. It will be appreciated that if a diaphragm 40 moves that the diaphragm 45 in turn moves. The movement of diaphragm 45 increases and decreases the volume of chamber 50 thereby drawing air into the check valve 51 and pumping the air out of check valve 52 into an outlet pipe 53.

Before disclosing the over-all system into which the present fluid pressure driven pump operates, a short description of the operation of the pump itself is believed warranted. If a fluid pressure is supplied to the inlet means 14 by the pipe 21, a fluid stream will issue towards the outlet means 19. With the arrangement as shown, the fluid stream will be directed into the outlet channel 16 at the initial period of flow. The fluid flowing into channel 16 passes into pipe 25 and then into chamber 35 where a pressure is built up against the diaphragm 40. As the pressure builds up against diaphragm 40, the diaphragm is moved to the right. As the diaphragm 40 moves to the right it operates the air pump by varying the volumes of chambers 44 and 50 in the manner previously described. The buildup of pressure in chamber 35 is reflected into pipe 37 and back into the feedback connection means 32 to the pressure equalizing chamber 31. After a short period of operation a jet of fluid is applied to the control means 30 and issues as a jet at right angles to the fluid flowing from the inlet means 14. Since the fluid amplifier 11 is in fact a true amplifier, the jet issuing from the control means or port 30 switches the inlet fluid from the inlet means 14 so that it flows into channel 15 and into the pipe 23. This flow immediately relieves the pressure in chamber 35 and the spring rate of the diaphragms 40 and 45 returns the diaphragms to their leftmost position. This then varies the volume of the chambers 44 and 50 operating the check valves 51 and 52 to complete a pumping cycle for the air pump or pump means 12. The reduction of pressure in the outlet channel 16 reduces the pressure in chamber 35 and thereby ceases the flow of fluid in the feedback channel 32 and from the control port 30. As soon as the flow from the control port 30 ceases, the fluid amplifier automatically switches back to its bias state thereby directing the fluid from the inlet means 14 into the outlet 16 to repeat the pumping cycle.

In effect the fluid amplifier 11 oscillates and causes the fluid pressure to shift back and forth between outlet channels 15 and 16. This continuously pulses the pump means 12 thereby supplying an air pressure to the pipe 53. The application of this type of arrangement is particularly useful in certain types of air conditioning control systems. The application of this principle is also advantageous in any fluid conditioning system that normally has a continuously flowing fluid. As such, the balance of the system will be described in connection with the particular type of fluid pressure driven pump that has been set out above.

A pressure fluid source 60 is shown and would normally be a source of water under pressure and the water would either be heated or cooled depending on the season of the year. The water pressure would be applied to pipe 61 that is connected to a valve means 62. The valve means 62 can either direct fluid into pipe 63 or into pipe 64. If the fluid is directed into pipe 63 it passes into a fluid operated load 65, which in the present case is a radiator or heat exchange means. It will thus be appreciated that if the fluid flow from the fluid source 60 passes through the fluid operated load 65, that heating or cooling can be accomplished by blowing air across the fluid operated load. If the valve means 62 is set such that pipe 63 is closed and pipe 64 is open, fluid flows around the fluid operated load 65 to a junction 66 and into pipe 21. The fluid flow into pipe 21 operates the pump system previously described. The fluid flows out of pipe 23 into a pipe 67 and is returned to the fluid source 60.

It will thus be appreciated that a hot or cold source of water can be supplied to a radiator 65 and can be controlled through or around the radiator 65 in response to the condition of a valve means 62. This water flow is continuous and is supplied through the amplifier means 11 and the fluid driven pump system 10. This flowing fluid thereby operates the system and provides air in pipe 53 that is in turn connected to a pressure operated control means 70. The pressure operated control means 70 could be in the form of a pneumatically operated thermostat that has an output in pipe 71 depending on the temperature of the space surrounding the thermostat. The pneumatic or pressure operated control means 70, by means of pipe 71, is connected to and operates the valve means 62. The valve means 62 is of any pneumatic type wherein a valve is physically operated from one position to another by a pneumatic actuator. The valve means 62 and the pressure operated control means or thermostat 70 are conventional elements that are commercially installed currently in systems where separate air supplies are needed to control a heating or cooling system. The pressure operated control means 70 can be of any type and is not specifically limited to a pneumatic thermostat.

It will thus be appreciated that a continuous fluid source 60 provides a fluid pressure to a fluid operated load 65 and through the fluid pressure driven pump system 10 back to the input of the fluid source 60. This obviously could be used in many systems in addition to the specific air conditioning or heating system described. The fluid flow is not greatly impeded by the present arrangement as the channels in the fluid amplifier means 11 are made large enough so that it acts as just a section in the regular plumbing of the system. The application of fluid pressure to the fluid pressure driven pump system 10 supplies a secondary fluid pressure that is available for control purposes.

FIGURE 2 discloses an embodiment of a portion of the system of FIGURE 1 which utilizes readily available components. A pneumatically operated thermostat 70' and a pneumatically actuated valve 62' replace pressure operated control means 70 and valve means 62 respectively. In all other respects, a system utilizing the components shown in FIGURE 2 is identical to that shown in FIGURE 1.

A system incorporating the fluid pressure driven pump in an air conditioning control system has been specifically set out as one of the preferred embodiments of the present invention. It should be appreciated that many variations are possible in the present invention and that the present invention is in no way specifically limited to the structure of the particular fluid amplifier, pump, or control system. Instead it is directed to the concept of applying the fluid pressure to operate a pump, to in turn supply a secondary fluid pressure in and of itself, in a system. Since the details of the present arrangement are illustrative only the applicant wishes to be limited in the scope of his invention only by the scope of the appended claims.

I claim as my invention:

1. In a fluid pressure driven pump system including: fluid amplifier means including an inlet connected to a source of fluid; said fluid amplifier means having outlet means; a first of said outlet means providing a continuous flow passage for said fluid; a second of said outlet means obstructed by pump means which is subjected to said fluid; control means at said inlet to cause a pressure differential across said inlet fluid flow to switch said fluid between said outlet means; and said control means including connection means connecting said control means to said second outlet means to feed back a pressure to switch said amplifier inlet between said outlet means; said inlet directed at said outlet means so as to normally build up a pressure at said pump means, said connection means, and said control means; said pressure in said connection means and said control means switching said amplifier means to relieve said pressure buildup and to in turn operate said pump means.

2. In a fluid pressure driven pump system including: a fluid amplifier including an inlet connected to a source of fluid; said fluid amplifier having two outlets; a first of said outlets providing a continuous flow passage for said fluid; a second of said outlets obstructed by pump means which is subjected to said fluid; a control port at said inlet to cause a pressure differential across said inlet fluid flow to switch said fluid between said outlets; and said control port including connection means connecting said port to said second outlet to feed back a pressure to switch said amplifier inlet between said outlets; said inlet directed at said second outlet so as to normally build up a pressure at said pump means, said connection means, and said control port; said pressure in said connection means and said control port switching said amplifier to relieve said pressure buildup and to in turn operate said pump means.

3. In a fluid pressure driven pump system including: fluid amplifier means including an inlet connected to a source of fluid; said fluid amplifier means having outlet means; a first of said outlet means providing a continuous flow passage for said fluid; a second of said outlet means having pump means which is subjected to said fluid; said pump means including pressure responsive means completely obstructing said second of said outlet means and moving with variations in pressure to pump a second fluid; control means at said inlet to cause a pressure differential across said inlet fluid flow to switch said inlet fluid between said outlet means; and said control means including connection means connecting said control means to said second outlet means to feedback a pressure to switch said amplifier inlet between said outlet means; said inlet directed at said outlet means so as to normally build up a pressure at said pump means, said connection means, and said control means; said pressure in said connection means and said control means switching said amplifier means to relieve said pressure buildup and to in turn operate said pump means.

4. In a fluid pressure driven pump system including: a fluid amplifier including an inlet connected to a source of fluid; said fluid amplifier having two outlets; a first of said outlets providing a continuous flow passage for said fluid; a second of said outlets having a pump which is subjected to said fluid; said pump including a pressure responsive diaphragm completely obstructing said second of said outlets and moving with variations in fluid pressure to pump a second fluid; a control port at said inlet to cause a pressure differential across said inlet fluid flow to switch said inlet fluid between said outlets; and said control port including connection means connecting said port to said second outlet to feed back a pressure to switch said amplifier inlet between said outlets; said inlet directed at said second outlet so as to normally build up a pressure at said pump diaphragm, said connection means, and said control port; said pressure in said connection means and said control port switching said amplifier to relieve said pressure buildup and to in turn operate said pump diaphragm to in turn pump said second fluid.

5. In a fluid pressure driven pump system including: a fluid amplifier including an inlet connected to a source of fluid; said fluid amplifier having two outlets; a first of said amplifier outlets providing a continuous flow passage for said fluid; a second of said amplifier outlets having a pump which is subjected to said fluid; said pump including a pressure responsive diaphragm completely obstructing said second of said amplifier outlets and moving with variations in fluid pressure to pump a second fluid; a chamber containing a pair of oppositely acting check valves and said chamber varied in volume by movements of said diaphragm; said check valves being an inlet and an outlet respectively for moving said second fluid; a control port at said amplifier inlet to cause a pressure differential across said amplifier inlet fluid flow to switch said amplifier inlet fluid between said amplifier outlets; and said control port including connection means connecting said port to said second amplifier outlet to feed back a pressure to switch said amplifier inlet between said amplifier outlets; said amplifier inlet directed at said second amplifier outlet so as to normally build up a pressure at said pump diaphragm, said connection means, and said control port; said pressure in said connection means and said control port switching said amplifier to relieve said pressure buildup and to in turn operate said pump diaphragm to in turn pump said second fluid.

6. In a fluid conditioning system including: a source of fluid and valve means connected to heat exchange means including bypass means for conditioning said fluid in a confined space; fluid amplifier means having an inlet connected in series with said heat exchange means and said bypass means to admit said fluid; said fluid amplifier means having outlet means; a first of said amplifier outlet means providing a continuous flow passage for said fluid in said system; a second of said amplifier outlet means having a pump means including an inlet and an outlet which is subjected to said fluid; control means at said amplifier inlet to cause a pressure differential across said amplifier inlet fluid flow to switch said fluid between said amplifier outlet means; said control means including connection means connecting said control means to said second amplifier outlet means to feed back a pressure to switch said amplifier inlet between said amplifier outlet means; said amplifier inlet directed at said second amplifier outlet means so as to normally build up a pressure at said pump means, said connection means, and said control means; said pressure in said connection means and said control means switching said amplifier means to relieve said pressure buildup; said pump means obstructing said second of said amplifier outlet means and moving with variations in fluid pressure to in turn pump a second fluid to connection means at said pump outlet; and said pump outlet connection means connected to condition operated control means and said valve means to cause said first fluid to flow in or bypass around said heat exchange means in response to said condition operated control means.

7. In an air conditioning system including: a source of water and valve means connected to radiator means including bypass means for conditioning air in a space; fluid amplifier means having an inlet connected in series with said radiator means and said bypass means to admit said water; said fluid amplifier means having outlet means; a first of said amplifier outlet means providing a continuous flow passage for said water in said system; a second of said amplifier outlet means having pump means including an inlet and an outlet which is subjected to said water; control means at said amplifier inlet to cause a pressure differential across said amplifier inlet water flow to switch said water between said amplifier outlet means; said control means including connection means connecting said control means to said second amplifier outlet means to feed back a pressure to switch said amplifier inlet between said amplifier outlet means; said amplifier inlet directed at said amplifier outlet means so as to normally build up a pressure at said pump means, said connection means, and said control means; said pressure in said connection means and said control means switching said amplifier means to relieve said pressure buildup; said pump means obstructing said second of said amplifier outlet means and operating with variations in water pressure to in turn pump air to connection means at said pump outlet; and said pump outlet connection means connected to air operated temperature control means and said valve means to cause said water to flow in or bypass around said radiator means in response to said temperature control means.

8. In an air conditioning system including: a source of water and a valve connected to radiator means including bypass means for conditioning air in a confined space; a fluid amplifier having an inlet connected in series with said radiator means and said bypass means to admit said water; said fluid amplifier having two outlets; a first of said amplifier outlets providing a continuous flow passage for said water in said system; a second of said amplifier outlets having a pump including an inlet and an outlet which is subjected to said water; a control port at said amplifier inlet to cause a pressure differential across said amplifier inlet water flow to switch said water between said amplifier outlets; said control port including connection means connecting said control port to said second amplifier outlet to feed back a pressure to switch said amplifier inlet between said amplifier outlets;

said amplifier inlet directed at said second amplifier outlet so as to normally build up a pressure at said pump, said connection means, and said control port; said pressure in said connection means and said control port switching said amplifier to relieve said pressure buildup; said pump including a pressure responsive diaphragm completely obstructing said second of said amplifier outlets and moving with variations in water pressure to in turn pump air to connection means at said pump outlet; and said pump outlet connection means connected to an air operated thermostat and said valve to cause said water to flow in or bypass around said radiator means in response to said thermostat.

9. In a fluid pressure driven pump system including: fluid amplifier means including an inlet connected to a source of fluid; said fluid amplifier means having outlet means; a first of said outlet means providing a continuous flow passage for said fluid; a second of said outlet means obstructed by pump means which is subjected to said fluid; and control means at said inlet to cause a pressure differential across said inlet fluid flow to switch said fluid between said outlet means; said inlet directed at said outlet means so as to normally build up a pressure at said pump means; said control means switching said amplifier means to relieve said pressure buildup and to in turn operate said pump means.

10. A fluid pressure driven pump including: fluid amplifier means having an inlet for connection to a source of fluid; said fluid amplifier means also having outlet means; a first of said outlet means providing a continuous flow passage for an inlet fluid flow; a second of said outlet means including pump means operable by application of a varying fluid pressure; and control means at said inlet for causing a pressure differential across the inlet fluid flow to switch the fluid flow between said outlet means thereby varying the fluid pressure at said pump means; said control means including means responsive to the fluid pressure at said pump means.

References Cited by the Examiner
UNITED STATES PATENTS

| | | | |
|---|---|---|---|
| 1,628,723 | 5/27 | Hall. | |
| 2,419,993 | 5/47 | Green et al. | 103—152 |
| 2,444,586 | 7/48 | Wuensch | 103—44 |
| 2,600,889 | 6/52 | Lehane | 165—22 |
| 2,613,919 | 10/52 | Russell et al. | 165—22 |
| 2,753,805 | 7/56 | Boivinet | 103—44 |
| 2,898,860 | 8/59 | Grober | 103—150 X |
| 2,909,323 | 10/59 | Cholvin et al. | 236—80 |
| 3,030,979 | 4/62 | Reilly | 137—81.5 |
| 3,111,931 | 11/63 | Bodine. | |

OTHER REFERENCES

"Fluid Transistor Circuits May Rival Electronics"; Pursglove; D.S., "Science and Mechanics Magazine," pages 81–84, volume 31, June 1960.

CHARLES SUKALO, Primary Examiner.

JOHN J. CAMBY, ALDEN D. STEWART, Examiners.